United States Patent Office.

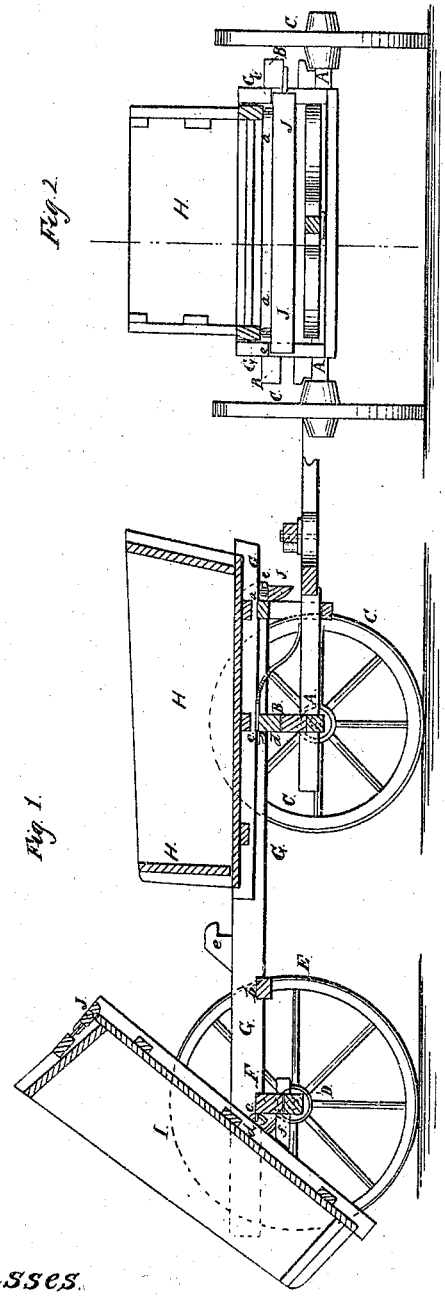

J. G. BURWELL AND J. J. WALLS, OF CRYSTAL SPRINGS, MISSISSIPPI.

Letters Patent No. 97,598, dated December 7, 1869.

IMPROVEMENT IN DUMPING-WAGON.

The Schedule referred to in these Letters Patent and making part of the same.

*To all whom it may concern:*

Be it known that we, J. G. BURWELL and J. J. WALLS, of Crystal Springs, in the county of Copiah, and State of Mississippi, have invented a new and improved Dumping-Wagon; and we do hereby declare that the following is a full, clear, and exact description thereof, which will enable others skilled in the art to make and use the same, reference being had to the accompanying drawings, forming part of this specification.

Figure 1 represents a vertical longitudinal section of our dumping-wagon.

Figure 2 is a front elevation of the same.

Similar letters of reference indicate corresponding parts.

This invention relates to a new dumping-wagon, which is to be used for conveying coal, sand, manure, and other suitable material.

The object of the invention is to economize human and animal labor, and to simplify the whole operation of loading, conveying, and dumping.

The invention consists in the application of double tilting-boxes to one single vehicle, whereby a set of animals and men will be enabled to do one-third more work than was previously done by an equal number.

A, in the drawing, represents the front axle of our dumping-wagon. It is pivoted to the front bolster B, in the ordinary or suitable manner, and carries the front wheels C, as usual.

D is the rear axle, carrying the wheels E E.

The rear axle is directly fastened to the rear bolster F, which is, by parallel side-rails G G, connected with the front bolster, as shown.

The rails G extend beyond the front bolster, and are in front connected by a cross-bar, $a$.

Another cross-bar, $b$, connects them in front of the rear bolster.

The upper surfaces of the front and rear bolsters, and of the cross-bars $a\ b$, are preferably arranged on a level, or at least in line.

On each bolster are fastened staples or perforated plates, $c\ c$, projecting backward.

H I are two tilting-boxes.

On the under side of each box are arranged hooks, $d\ d$, which, when fitted into the plates $c$, serve to hinge the boxes to the frame. The hooks are set far enough forward on each box, to allow it to dump automatically, when not locked.

When the boxes are held locked, they rest in front on the cross-bars $a\ b$, respectively, and the front ends are held down by cross-bars J J, which are suspended from the boxes, and fitted under hooks which project from the side-rails G, as shown.

Every box, when dumped, may be sustained by arms $f\ f$, projecting from the axles, as shown.

Having thus described our invention,

We claim as new, and desire to secure by Letters Patent—

The combination, with the front and rear axles A D, of the two parallel rails G G, with hooks $e\ e$, bolsters B F, with perforated plates $c\ c$, and arms $f\ f$, boxes H I, with pivoted and pendent bars J J, and hooks $d\ d$, all constructed and operating substantially as set forth.

J. G. BURWELL.
J. J. WALLS.

Witnesses:
G. H. APPEL,
G. K. HIBLER.